Dec. 22, 1942.  S. R. OLDHAM  2,306,079
SHAPE CUTTING MACHINE PATTERN TABLE
Filed Jan. 23, 1942
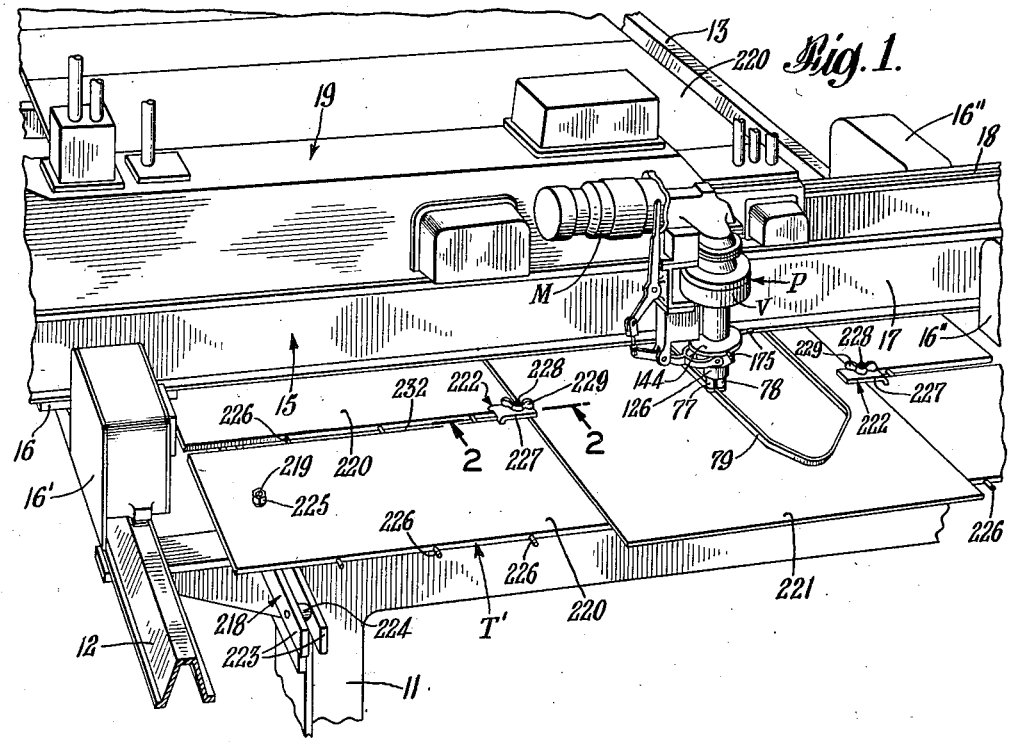
INVENTOR
SAMUEL R. OLDHAM
BY
ATTORNEY Patented Dec. 22, 1942

2,306,079

UNITED STATES PATENT OFFICE 2,306,079

SHAPE-CUTTING MACHINE PATTERN TABLE

Samuel R. Oldham, West Orange, N. J., assignor to Union Carbide and Carbon Corporation, a corporation of New York Application January 23, 1942, Serial No. 427,913

10 Claims. (Cl. 266—23)

This invention relates to contouring machines, and more particularly to a pattern table for machines adapted to propel one or more blowpipes or other tools in a plane over a work surface, along a path defined by a templet or pattern on the table. This application is a continuation-in-part of my application Serial No. 161,085, filed August 26, 1937, now Patent No. 2,279,338, dated April 14, 1942.

Machines of this type generally utilize flame-cutting blowpipes for flame-severing ferrous metal bodies along predetermined contours, and generally are known as shape-cutting machines, though such machines are adapted for use with other tools and with other types of blowpipes. Hence, although the present invention is particularly described in connection with a shape-cutting machine, the invention is in nowise limited in this respect, and it will be understood that the principles are applicable to other similar devices that support other tools for movement over work surfaces.

It is customary with shape-cutting machines to support the cutting tool on a carriage freely-movable in a plane, and to propel the carriage in desired directions by a traction head having one or more driving elements engageable with a fixed templet of the desired shape. Often the templet comprises a print, or a drawing of pencil or chalk lines laid upon or formed directly on the smooth flat traction surface or pattern table, in which event the tool-supporting carriage is directed by manually guiding a traction wheel along the templet contour appearing on the table surface. Where the same shape is followed repeatedly, it is more efficient to employ automatic tracing means, such as a traction head having a pair of driving trunnions operatively engaging a mechanical templet comprising a small metallic or other strip bent to the desired contour. The strip is generally supported upon a base or backing sheet, such as of metal or plywood, by which the entire templet may be secured conveniently to the pattern table.

Heretofore, no satisfactory arrangement has been known whereby such mechanical or built-up templets might be secured firmly at any desired location on the pattern table, without so marring the surface of the table as to interfere with the free rolling of a hand-guided traction wheel on the table surface. The present invention provides a pattern table which is adaptable for use with either a hand-guided or templet-guided traction wheel, and which is composed of elements that allow assembling the table surface to any desired size and at any desired location on the machine.

The principal objects of the present invention are to provide an improved pattern table for a shape-cutting or similar machine; to provide a shape-cutting machine pattern table formed of a series of adjoining plate elements or sections that may be assembled to form a smooth continuous surface of any desired length; to provide such a pattern table wherein the elements interlock but are separable slightly, while maintaining interlocking relation, to provide access for a templet clamp; and to provide an improved means for locking a mechanical templet onto a pattern table yet which in no way mars the smooth flat surface upon which the patterns may be drawn. These and other objects of the invention will become apparent from the following description and the accompanying drawing, disclosing an embodiment of the invention as applied to a shape-cutting machine of the type disclosed in my copending application, Serial No. 161,085, now Patent No. 2,279,338.

In the drawing,

Fig. 1 is a perspective view of a portion of a blowpipe-supporting carriage freely movable in all directions in a horizontal plane over a pattern table;

Figs. 2 and 3 are longitudinal sectional views through the pattern table, taken on the lines 2—2 and 3—3 of Figs. 1 and 2 respectively, showing the templet clamp in operating position; and Fig. 4 is a cross-sectional view through a modified bar spacer which also may be used as a bar coupler.

Generally speaking, the invention comprises a pattern table T' formed of interlocked plate sections located beneath the tool-supporting carriage 19 of a shape-cutting or similar machine. The table rests on a base or frame including longitudinal bars along which the plate sections are slidably adjustable. Dowel pins or similar interlocking members extend between the abutting edges of adjoining plate sections to hold the edges in alignment, thereby to provide a continuous plane traction surface when the plates are assembled close together. If it is desired to mount a mechanical templet on the table for automatic tracing operations, two or more plates are separated slightly and templet clamps are locked in position on the table with bolts extending through the slots formed between adjoining plates.

The present apparatus comprises a pattern table T' having a base 11 made up of a number of cast iron sections bolted together, along the front and back of which a pair of rails 12 and 13 are fastened in parallel relation, so as to support a lower carriage 15 for limited horizontal movement longitudinally of the rails. Since absolute straightness of these rails is an important factor in assuring accurate results, they preferably are made of semi-steel to withstand the high temperatures created during flame cutting, and are heat-treated to relieve all strain, thereby assuring perfect alignment under the most severe conditions. The lower carriage 15 comprises wheel frames 16 at the front and rear adapted to ride along the rails 12 and 13. All four wheels of the lower carriage 15 are of cast iron, and are provided with anti-friction bearings completely enclosed and lubricated for the life of the machine. Light alloy or aluminum guards 16' protect the front wheels, while heavier cast iron guards 16" protect the rear wheels so as to assist in counterbalancing the weight of the overhanging parts at the front or blowpipe end of the machine. Upper carriage rails 17 and 18 are firmly secured to the front and rear frames 16 of the lower carriage 15, at right angles to the lower rails.

An upper carriage 19 free to roll on the rails 17 and 18, is constructed and arranged to support substantially all of the operating controls, most of which are in duplicate so as to be accessible from both the cutting and tracing positions of the shape-cutting machine. The forward end of the carriage 19 is adapted to support a cutting blowpipe as shown in my Patent No. 2,279,338, and, therefore overhangs the work to be shaped.

A traction-propelling device or traction head P comprises a motor M, rigidly mounted on the upper carriage 19 in operative association with a combined variable-speed transmission and differential unit V. The head P drives a pair of spaced shafts adapted to be connected to a pair of oppositely-rotatable, traction-propelling elements or trunnions 77, 78, arranged to engage a raised templet or pattern 79 on the table T'. The head P further is adapted interchangeably to accommodate a hand-guided traction-propelling unit of the type shown in my Patent No. 2,279,338, adapted to roll on the surface of table T' to follow a predetermined pattern located substantially within the plane of the top surface thereof. Such a traction-propelling unit may be guided conveniently over lines or sketches on the surface of the table T' by means of radially disposed handles 175 circumferentially spaced about a flange 144 on a steering sleeve extension 126.

The table base 11 is adapted to accommodate a pair of supports 218 adjacent to the respective rails 12 and 13, only one of which supports is shown in Fig. 1. The supports 218 extend the full length of the front and back of the table T', and preferably are made up of two bars 223 held in closely adjoining relation by spacers 224.

The table top comprises a plurality of plate sections 220, preferably of polished aluminum alloy, which sections rest at their back and front ends on the respective supports 218. T-bolts 219 lock the respective plates 220 in position by extending from each plate downwardly between the respective bars 223 with the bolt head abutting against the under edges of the bars 223. The plates may be tightened into position by nuts 225 threaded on the upper end of the bolts 219. Accordingly the plates 220 may be shifted to any desired position along the supports 218 while the bolts 219 are loose, and the plates when properly located may be firmly and quickly secured in place. Plates 220 may be removed as desired by removing the nut 225 from each bolt 219 as necessary and sliding the plates free.

The respective plates 220 may be united to form a continuous substantially plane surface by providing interlocking means such as spaced dowel pins 226 and mating recesses in the abutting edges of adjoining plates. In this manner the plates 220 may be united to form a surface adapted to receive a paper or similar print, or to have inscribed thereon, as by chalk or pencil, the contour to be followed. The traction means may be hand-guided about such a contour to propel a reproducing tool along a similar path.

The improved table is quickly and easily convertible to use with mechanical templets 79 without in any way detracting from the smooth and continuous nature of the table top. By loosening the bolts 219 as necessary, one or more of the plates 220 may be shifted along the supports 218 to any desired position on the machine, or to separate the plates as shown in Fig. 1, to provide slots or spaces 232 through which clamps 222 may extend for holding the templet support or sheet backing 221 on the table.

The clamps 222 may be of any desired construction but preferably comprise a slotted clamping plate 227 keyed to a T-bolt 228, the milled shank of which extends upwardly from the head 231 through the plate 227, to receive a wing nut 229. The clamping plate 227 preferably is flanged along one end forming a leg 234 of a height substantially equal to the thickness of the templet support 221, to keep the main flat portion of the clamping plate 227 parallel with the table top.

The clamps 222 are mounted in position by inserting the head of the T-bolt 228 through the slot formed between separated plates 220 and swiveling the bolts until the head engages the back of the plates. The clamps 222 then may be slid along the slot until they engage the templet support 221, after which the nuts 229 may be tightened to lock the templet in place as shown in Fig. 1. By keying the clamping plate to the bolts 228 the operator knows at all times of the position of the head 231 beneath the plates 220 by observing the position of the plate 227 or the milled flats on the bolt shank. Preferably the plate 227 extends at right angles to the head 231 of the T-bolt 228, so that while the head extends transversely of the slot 232, the clamping plate 227 extends chiefly along the slot.

Although the templet is disclosed in Fig. 1 as being mounted on the table T' with the edges of the templet parallel with the sides of the machine, it will be understood that the templet may be mounted diagonally on the table and that each clamp 222 may be twisted about the axis of the bolt 228 through an angle of 45° or more in either direction. By thus shifting the clamps they may be used to secure a templet which is too small to extend beyond the width of one plate 220, and therefore must be held along one edge only of the templet support 221, when the edge is aligned with a slot 232.

Fig. 4 discloses an alternative form of bar spacer, comprising a yoke-shaped lug 224', the arms 235 of which are milled out a sufficient distance apart to accommodate the bars 218 with sufficient spacing for free sliding action of the bolts 219 between the bars. The arms 235 straddle the bars, and hold the bars in spaced relation by means of machine screws 236 extending through apertures 237 in the arms 235 and threaded to the bars 218. By extending the lug 224' and employing a pair of spaced apertures along each arm 235, the lug 224' may be used as a coupler to join extensions to the bars 218 when the machine is to be lengthened. It will be noted that the lugs 224' provide clearance below the edges of the bars 218 so that the heads of bolts 219 may pass without interference, and since no part of the lugs 224' projects between the bars 218, the plates 220 may be slid freely from one end of the machine to the other without interfering with the bar spacers.

It will be understood that the invention may be modified without sacrificing its advantages or departing from the principles thereof.

I claim:

1. A device for use with interchangeable traction-propelling units of a shape-cutting machine, comprising a plurality of identical plates provided with interfitting dowel connections along their longitudinal edges; a supporting structure for said plates; and means for fastening said plates to said supporting structure; a templet-supporting device adapted to be rigidly mounted on said plates; and clamps arranged to pass between spaces formed by separating said plates for securing said templet-supporting device to said plates.

2. A contouring machine pattern table comprising a plurality of smooth flat plates having close-fitting adjoining edges adapted when in abutting relation to form a continuous substantially plane surface; plate supports extending horizontally beneath said plates adjacent to opposite ends thereof; and guide members engaging said plates and movable along said supports to regulate the position of said plates along said supports.

3. A contouring machine pattern table as claimed in claim 2 wherein said guide members include locking means adapted to secure said plates in predetermined position on said supports.

4. A contouring machine pattern table comprising a plurality of smooth flat plates having close-fitting adjoining edges adapted when in abutting relation to form a continuous substantially plane surface; plate supports extending horizontally beneath said plates adjacent to opposite ends thereof, said supports comprising closely spaced bars; guide bolts extending between said bars of each support from said plates to regulate the position of said plates along said supports; and means to tighten said bolts, thereby to lock said plates in predetermined position on said supports.

5. A contouring machine pattern table comprising a base; a pair of spaced horizontal supports extending along the top of said base; a plurality of polished aluminum alloy plates spanning said supports and being slidable along said supports; means for securing said plates in predetermined position on said supports; and interlocking means adapted to locate the abutting edges of adjoining plates to form a continuous plane surface upon which a pattern may be drawn.

6. A contouring machine pattern table convertible for use with hand-guided or templet-guided traction heads, comprising a table base; a table top on said base having abutting plate sections forming a continuous substantially plane surface for receiving thereon a drawing of the desired contour capable of being followed by a hand-guided traction head, said plate sections being separable to form slots between adjoining plate sections; fastening means for maintaining said plate sections in predetermined position relative to said base; and templet clamping means having locking means extending through said slots for engagement with the underside of said plate sections, said clamping means being adapted to engage and secure in predetermined position on said top a templet of the type capable of automatically guiding a traction head.

7. A contouring machining pattern table convertible for use with hand-guided or templet-guided traction heads, comprising a table base; a table top on said base having abutting plate sections forming a continuous substantially plane surface for receiving thereon a drawing of the desired contour capable of being followed by a hand-guided traction head, said plate sections being separable to form slots between adjoining plate sections; fastening means for maintaining said plate sections in predetermined position relative to said base; and templet clamping means comprising a T-bolt adapted to extend through one of said slots with the head of said bolt located transversely of said slot and abutting the adjoining under-surface of said plate sections, said clamping means also having an elongated clamping plate above said plate sections and mounted on said bolt so as to extend along said slot, for engagement with a mechanical templet resting on said table top, said clamping means also comprising means for tightening said bolt to thereby lock said templet in predetermined position on said table top.

8. A contouring machine pattern table as claimed in claim 7 wherein said clamping plate is provided at the end opposite said templet with a turned-down flange of a height substantially equal to the thickness of said templet.

9. A contouring machine pattern table as claimed in claim 4, including spacers for said bars, said spacers comprising yoke-shaped members straddling said bars with sufficient clearance beneath said bars for the projecting end of said bolts to permit said bolts to pass said spacers when the position of said plates is regulated.

10. A contouring machine pattern table comprising a plurality of smooth flat plates having close-fitting adjoining edges adapted when in abutting relation to form a continuous substantially plane surface; plate supports extending horizontally beneath said plates adjacent to opposite ends thereof, said supports comprising closely spaced bars; spacers for said bars; guide means extending between said bars of each support from said plates to regulate the position of said plates along said supports; said spacers comprising yoke-shaped members straddling said bars from below said bars, thereby permitting said guide means to pass said spacers when the position of said plates is regulated.

SAMUEL R. OLDHAM.